(No Model.) 2 Sheets—Sheet 1.
G. RICHTER.
COMBINED DISK HARROW, SOD CUTTER, AND ROLLER.
No. 538,536. Patented Apr. 30, 1895.

WITNESSES
G. S. Elliott.
E. W. Johnson

Gerhard Richter
INVENTOR
by
Attorney (No Model.) 2 Sheets—Sheet 2.

G. RICHTER.
COMBINED DISK HARROW, SOD CUTTER, AND ROLLER.

No. 538,536. Patented Apr. 30, 1895.

WITNESSES
G. S. Elliott,
T. W. Johnson

Gerhard Richter
INVENTOR
by [signature]
Attorney

UNITED STATES PATENT OFFICE.

GERHARD RICHTER, OF FREEPORT, MINNESOTA.

COMBINED DISK HARROW, SOD-CUTTER, AND ROLLER.

SPECIFICATION forming part of Letters Patent No. 538,536, dated April 30, 1895.

Application filed December 6, 1894. Serial No. 531,001. (No model.)

*To all whom it may concern:*

Be it known that I, GERHARD RICHTER, a citizen of the United States of America, residing at Freeport, in the county of Stearns and State of Minnesota, have invented certain new and useful Improvements in a Combined Disk Harrow, Sod-Cutter, and Roller; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in a combined disk-harrow, turf or sod cutter and roller.

The object of the invention is to provide an implement for cutting sod or turf and leveling the same, the device being particularly designed for use on lands that have been set out in hay or grass, and by means of the implement the sod or turf can be loosened and leveled.

Figure 1:
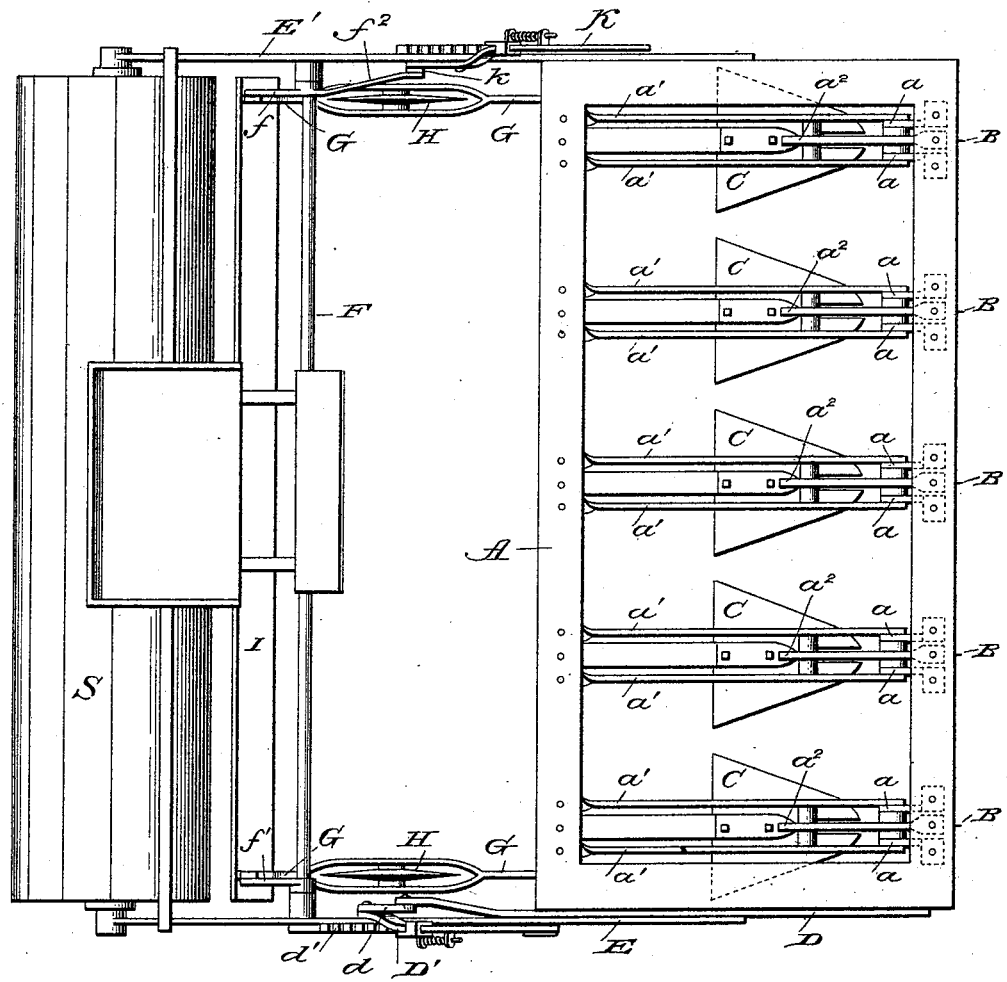
Figure 2:
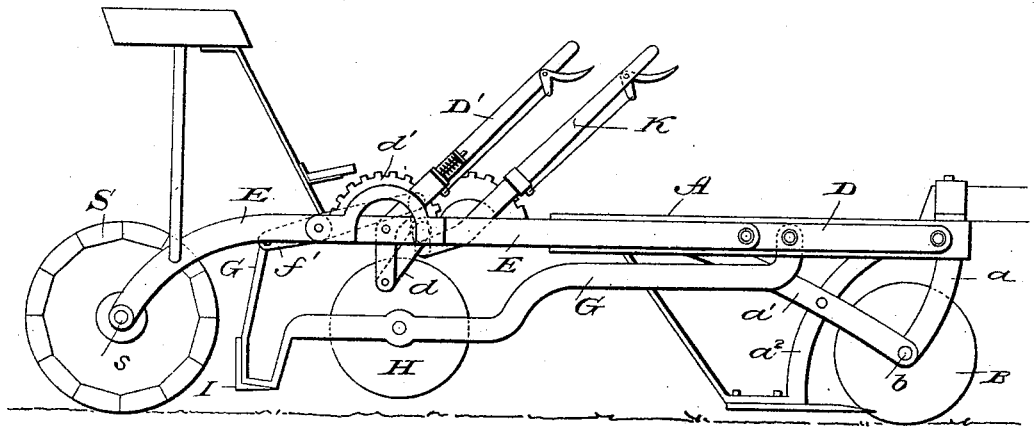
Figure 3:
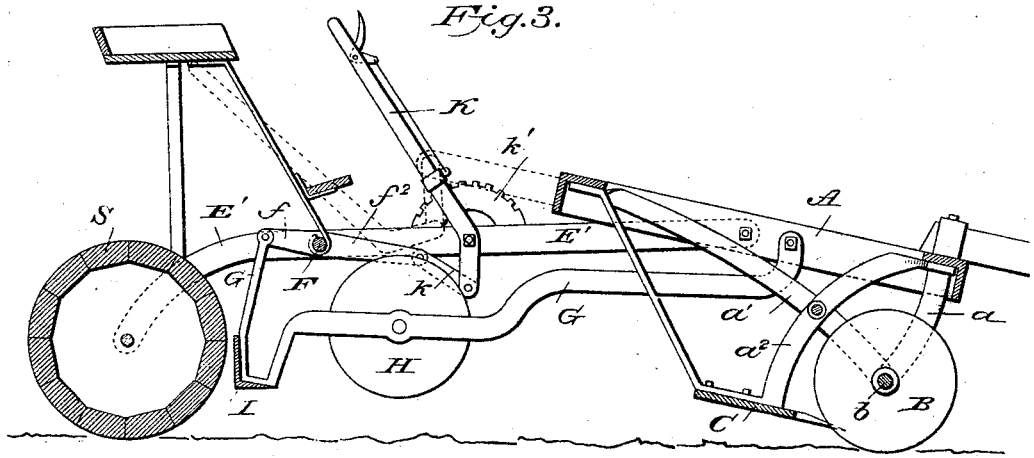

In the accompanying drawings, forming part of this specification, Figure 1 is a plan view of an implement constructed in accordance with my invention. Fig. 2 is a side elevation showing the parts in one position, and Fig. 3 is a sectional view showing the parts in a different position from that shown in Fig. 2.

A designates a rectangular frame which is made up of bars of angle iron rigidly connected to each other. To this frame is attached the draft tongue, and rigidly secured thereto are depending bars $a$ and $a'$ which support transverse shafts $b$ upon which are journaled disks B. Depending brackets $a^2$ are also secured to the rectangular frame A between the bars $a$ and $a'$, the forward member of the bracket being bolted to the bar $a'$ as shown. To the lower horizontal portions of the brackets $a^2$ are attached plate-cutters C the forward ends of which are slotted to receive the disks B. By bolting the depending bars $a'$ and the brackets $a^2$ together as shown these parts serve to brace each other and hold the disks and plate-cutters in relative position.

To one side of the rectangular frame A is rigidly secured a rearwardly extending bar D, and to the end of this bar is connected a link $d$ which is also connected to the bent end of a lever D', the said lever being pivoted to a bar E which is pivotally connected at its forward end to the rectangular frame A at a point slightly in rear of its transverse center. The rear end of the bar E is curved downwardly and supports one end of a transverse shaft $s$ upon which the rollers S are mounted, the other end of said shaft being supported in a bar E' which is similar to the bar E and pivoted in a like manner to the other side of the rectangular frame A. The lever D' which is pivoted to the bar E is provided with a spring-actuated dog which engages with a segment-rack $d'$ on the bar E for holding said lever in an adjusted position, and by adjusting the lever D' the frame A may be changed to either a horizontal or inclined position as shown in Figs. 2 and 3.

The bars E and E' are connected to each other in advance of the rollers S by means of a cross-bar or shaft F, said shaft being journaled in the bars so as to be permitted to have a rocking movement. Upon the shaft F adjoining the inner sides of the bars E and E' are rigidly secured crank-arms $f$ and $f'$ which project rearwardly from the shaft and are connected to the rear ends of bars G G, said bars being similarly bent, as shown in Figs. 2 and 3, and are pivoted at their forward ends to the side pieces of the rectangular frame A immediately forward of the transverse center. Immediately in the rear of the rectangular frame A the bars G are split and spread, as shown in Fig. 1, so as to receive disks H H having stub-shafts which are journaled in said bars. The rear portions of the bars G have rigidly secured thereto an angle plate I which extends transversely across the machine in front of the rollers, the lower part of said plate being formed into a cutting edge for cutting weeds. The blade or plate I is also intended to level the ground in front of the rollers, as hereinafter set forth.

The crank-arm $f$ is provided with a forwardly-extending portion $f^2$ which is connected by a link $k$ to a lever K pivoted to the bar E', said lever having a spring-actuated pawl which engages with a segment-rack $k'$ on said bar E', and when the lever is moved in either direction it will rock the shaft F and raise or lower the bars G which carry the disks H H and leveling-plate I.

In operation, when it is desired to only loosen the turf or sod and level the same the parts are adjusted to the position shown in Fig. 2 of the drawings, and in this position the disks B will cut the sod and the plate-cutters C pass under the same and cut the roots, while the plate I will cut weeds and carry along with it any soil that is above the proper level and deposit it when a depression is met with. Should it be desired to dump the soil or other material which is collected in front of the plate I it can be effected by operating the lever G. The rollers serve to support the rear part of the apparatus and level the turf after it is cut.

When it is desired to break up the sod or turf both levers are thrown to incline rearwardly which will cause the disks B to enter the soil to a considerable depth, and will incline the plate-cutters C so that the sod or turf will be lifted and displaced to a considerable extent. The lever K may be positioned so as to raise the plate I, or the plate may be left lowered to further break up the sod or turf.

Having thus described my invention, what I claim as new, and desire to secure by Letters Patent, is—

1. In a sod or turf cutter, the combination, of a frame A having disk-cutters B and plate-cutters C rigidly secured thereto, bars E and E' connected to the frame and extending rearwardly therefrom, rollers supported by the rear ends of the bars, and bars G G and D extending rearwardly from the frame A, the bars G G carrying disks H and a transverse plate I, together with levers D' and K pivoted to the bars E and E' and connected to the bars G G and D, substantially as shown and for the purpose set forth.

2. In a sod or turf cutter, the combination, of a frame A having attached thereto a series of disks B and plate-cutters C, a bar D rigidly secured to the frame A so as to project rearwardly therefrom, bars E and E' pivotally attached to the frame A, rollers supported at the rear ends of the bars E and E', and a lever pivoted to the bar E and connected to the bar D by a link, substantially as shown and for the purpose set forth.

3. In a sod or turf cutter, the combination, of a frame A carrying a transverse series of disk-cutters B and rear of said cutters a corresponding series of plate-cutters C, bars E and E' attached to the frame A and supporting rollers at their rear ends, bars G G pivoted at their forward ends to the frame A, said bars carrying disks H and being connected to each other by an angle-plate I, a cross-bar or shaft F journaled in the bars E and E', and having crank-arms, and a lever K pivoted to the bar E' and connected to the rock-shaft, together with the plate I and disks H, substantially as shown and for the purpose set forth.

4. In a sod or turf cutter, the combination, of a rectangular frame A, depending bars $a$ and $a'$ between the lower ends of which are journaled rotary disks, together with brackets $a^2$ provided with a flat lower portion to which are adapted to be secured plate-cutters, the forward members of the brackets $a^2$ passing between the bars $a'$ and being bolted thereto, substantially as shown and for the purpose set forth.

In testimony whereof I affix my signature in presence of two witnesses.

GERHARD RICHTER.

Witnesses:
L. A. THULL,
HENRY BENOLKEN.